(12) United States Patent
Cho et al.

(10) Patent No.: US 9,556,936 B2
(45) Date of Patent: Jan. 31, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/939,432

(22) Filed: Nov. 12, 2015

(65) Prior Publication Data
US 2016/0333979 A1 Nov. 17, 2016

(30) Foreign Application Priority Data
May 13, 2015 (KR) .................. 10-2015-0066907

(51) Int. Cl.
*F16H 3/66* (2006.01)

(52) U.S. Cl.
CPC ......... *F16H 3/66* (2013.01); *F16H 2200/0073* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 7,582,040 B2 * | 9/2009 | Kamm | ................... | F16H 3/66 475/275 |
| 7,699,736 B2 * | 4/2010 | Diosi | ................... | F16H 3/66 475/277 |
| 7,887,457 B2 * | 2/2011 | Wittkopp | ................ | F16H 3/666 475/277 |

(Continued)

FOREIGN PATENT DOCUMENTS

| | | |
|---|---|---|
| KR | 10-2012-0132022 (A) | 12/2012 |
| KR | 10-1317142 (B1) | 10/2013 |

(Continued)

*Primary Examiner* — Colby M Hansen
(74) *Attorney, Agent, or Firm* — Morgan, Lewis & Bockius LLP

(57) ABSTRACT

A planetary gear train of an automatic transmission for a vehicle may include an input shaft receiving power of an engine, an output shaft outputting shifted power, a first planetary gear set, a second planetary gear set, a third planetary gear set, a fourth planetary gear set, a first rotational shaft selectively connected with a transmission housing, a second rotational shaft, a third rotational shaft selectively connected with the transmission housing, a fourth rotational shaft directly connected with the input shaft to be continuously operated as an input element, a fifth rotational shaft selectively connected with the second rotational shaft, a sixth rotational shaft selectively connected with the second rotational shaft, a seventh rotational shaft directly connected with the output shaft to be continuously operated as an output element, an eighth rotational shaft selectively connected with the input shaft and the sixth rotational shaft, and six frictional elements.

9 Claims, 2 Drawing Sheets

(56) References Cited

U.S. PATENT DOCUMENTS

| | | | | |
|---|---|---|---|---|
| 8,007,394 B2* | 8/2011 | Phillips | ............... | F16H 3/66 475/275 |
| 8,052,566 B2* | 11/2011 | Wittkopp | ............... | F16H 3/66 475/275 |
| 8,192,320 B2* | 6/2012 | Carey | ............... | F16H 3/66 475/282 |
| 8,333,676 B2* | 12/2012 | Kim | ............... | F16H 3/666 475/277 |
| 8,465,390 B2* | 6/2013 | Brehmer | ............... | F16H 3/66 475/282 |
| 9,429,215 B2* | 8/2016 | Noh | ............... | F16H 3/66 |
| 2010/0210395 A1* | 8/2010 | Phillips | ............... | F16H 3/666 475/275 |
| 2013/0210570 A1* | 8/2013 | Mellet | ............... | F16H 3/66 475/275 |
| 2014/0371027 A1* | 12/2014 | Goleski | ............... | F16H 3/62 475/288 |
| 2016/0169341 A1* | 6/2016 | Cho | ............... | F16H 3/66 475/277 |

FOREIGN PATENT DOCUMENTS

| | | |
|---|---|---|
| KR | 10-2014-0046240 (A) | 4/2014 |
| KR | 10-1427977 B1 | 8/2014 |

* cited by examiner

FIG. 2

|      | C1 | C2 | C3 | C4 | B1 | B2 | Gear ratio |
|------|----|----|----|----|----|----|-----------|
| 1ST  | ○  |    |    |    | ○  | ○  | 3.500     |
| 2ND  |    |    | ○  |    | ○  | ○  | 1.875     |
| 3RD  | ○  |    | ○  |    |    | ○  | 1.469     |
| 4TH  |    | ○  | ○  |    |    | ○  | 1.375     |
| 5TH  | ○  | ○  |    |    |    | ○  | 1.242     |
| 6TH  | ○  |    |    | ○  |    | ○  | 1.158     |
| 7TH  | ○  | ○  |    | ○  |    |    | 1.000     |
| 8TH  | ○  |    |    | ○  | ○  |    | 0.882     |
| 9TH  | ○  | ○  |    |    | ○  |    | 0.808     |
| 10TH |    | ○  | ○  |    | ○  |    | 0.750     |
| 11TH | ○  |    | ○  |    | ○  |    | 0.545     |
| REV  |    |    |    | ○  | ○  | ○  | 2.063     |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0066907 filed May 13, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle which is capable of implementing eleven forward speeds using a minimum number of configurations and improving power transfer performance to reduce fuel consumption.

Description of Related Art

Recently, increasing oil prices have placed intense pressure on manufacturers to produce more fuel-efficient vehicles. Particularly in the case of engines, manufacturers have been pursuing efforts to reduce the weight and improve fuel efficiency of vehicles by reducing engine size, etc.

As a result, research into reduction of weight and enhancement of fuel efficiency through down-sizing has been conducted in the case of an engine and research for simultaneously improving fuel efficiency, and operability and competitiveness in fuel efficiency through providing multiple speed stages has been conducted in the case of an automatic transmission.

However, in the automatic transmission, as the transmission speeds or stages increases, the number of internal components increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components is important in order to increase a fuel efficiency enhancement effect through the multiple speed stages.

In this aspect, in recent years, 8 and 9-speed automated transmissions tend to be implemented and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles having advantages of improving power transfer performance and fuel costs by a multi-stage of a shift stage by implementing the shift stage of 11 forward speed stages and 1 reverse speed stage by a minimum configuration, and improving silence drivability of the vehicle by using a drive point in a low revolution per minute (RPM) region of an engine.

According to various aspects of the present invention, a planetary gear train of an automatic transmission for a vehicle may include an input shaft receiving power of an engine, an output shaft outputting shifted power of the engine, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the first and second sun gears and selectively connected with a transmission housing, a second rotational shaft including the first planetary carrier and the fourth ring gear, a third rotational shaft including the first ring gear and selectively connected with the transmission housing, a fourth rotational shaft including the second planetary carrier and directly connected with the input shaft to be continuously operated as an input element, a fifth rotational shaft including the second ring gear and the third sun gear and selectively connected with the second rotational shaft, a sixth rotational shaft including the third planetary carrier and selectively connected with the second rotational shaft, a seventh rotational shaft including the third ring gear and the fourth planetary carrier and directly connected with the output shaft to be continuously operated as an output element, an eighth rotational shaft including the fourth sun gear, selectively connected with the input shaft, and selectively connected with the sixth rotational shaft, and six frictional elements provided to selectively connect at least two rotational shafts with each other and to selectively connect at least one of the rotational shafts with the transmission housing.

Each of the first, second, third, and fourth planetary gear sets may respectively be a single pinion planetary gear set.

The first, second, third, and fourth planetary gear sets may be sequentially disposed from an engine side.

The six frictional elements may include a first clutch interposed between the input shaft and the eighth rotational shaft, a second clutch interposed between the second rotational shaft and the fifth rotational shaft, a third clutch interposed between the second rotational shaft and the sixth rotational shaft, a fourth clutch interposed between the sixth rotational shaft and the eighth rotational shaft, a first brake interposed between the first rotational shaft and the transmission housing, and a second brake interposed between the third rotational shaft and the transmission housing.

Shift stages implemented by selective operation of each of the six frictional elements may include a first forward shift stage implemented by simultaneously operating the first clutch and the first and second brakes, a second forward shift stage implemented by simultaneously operating the third clutch and the first and second brakes, a third forward shift stage implemented by simultaneously operating the first and third clutches and the second brake, a fourth forward shift stage implemented by simultaneously operating the second and third clutches and the second brake, a fifth forward shift stage implemented by simultaneously operating the first and second clutches and the second brake, a sixth forward shift stage implemented by simultaneously operating the first and fourth clutches and the second brake, a seventh forward shift stage implemented by simultaneously operating the first, second, and fourth clutches, an eighth forward shift stage implemented by simultaneously operating the first and fourth clutches and the first brake, a ninth forward shift stage implemented by simultaneously operating the first and second clutches and the first brake, a tenth forward shift stage implemented by simultaneously operating the second and third clutches and the first brake, an eleventh forward shift stage implemented by simultaneously operating the first and third clutches and the first brake, and a reverse shift stage implemented by simultaneously operating the fourth clutch and the first and second brakes.

According to various aspects of the present invention, a planetary gear train of an automatic transmission for a vehicle may include an input shaft receiving power of an engine, an output shaft outputting shifted power of the engine, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first clutch selectively connecting the input shaft with the fourth sun gear, a second clutch selectively connecting the first planetary carrier and the fourth ring gear with the second ring gear and the third sun gear, a third clutch selectively connecting the first planetary carrier and the fourth ring gear with the third planetary carrier, a fourth clutch selectively connecting the third planetary carrier with the fourth sun gear, a first brake selectively connecting the first sun gear to the transmission housing, and a second brake selectively connecting the first ring gear to the transmission housing, in which the input shaft may be directly connected with the second planetary carrier, the output shaft may be directly connected with the fourth planetary carrier, the first sun gear may be directly connected with the second sun gear, the first planetary carrier may be directly connected with the fourth ring gear, the second ring gear may be directly connected with the third sun gear, and third ring gear may be directly connected with the fourth planetary carrier.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each shift stage of each frictional element which is used for the exemplary planetary gear train according to the present invention.

Figure 1:
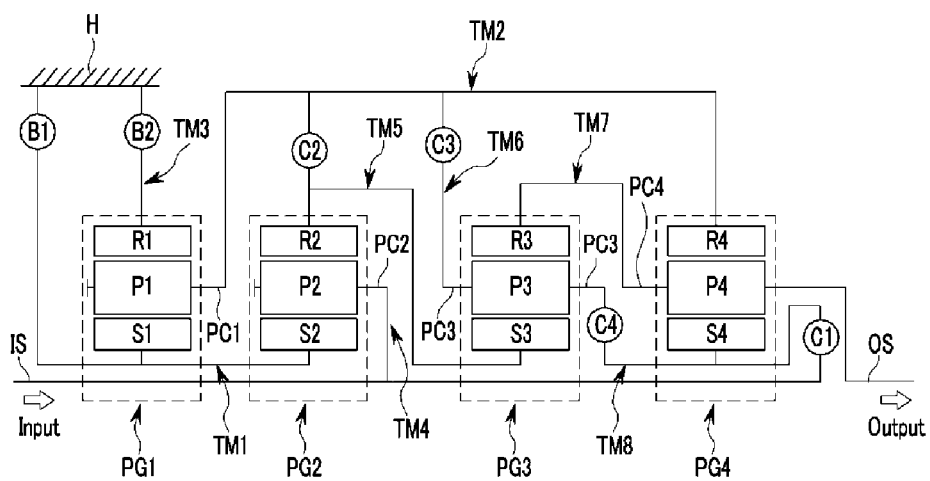
FIG. 1 is schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is schematic diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 disposed on the same shaft line, an input shaft IS, an output shaft OS, eight rotational shafts TM1 to TM8 that directly connect the respective rotational elements of the first, second, third, and fourth planetary gear sets PG1, PG2, PG3, and PG4 to each other, six frictional elements C1 to C4 and B1 to B2, and a transmission housing H.

Thus, rotation power input from the input shaft IS is shifted by a complementary operation of the first, second, third, and fourth planetary gear sets PG1, PG2, PG3, and PG4 and the shifted rotation power is outputted through the output shaft OS.

In addition, the respective simple planetary gear sets are disposed in the order of the first, second, third, and fourth planetary gear sets PG1, PG2, PG3, and PG4 from an engine side.

The input shaft IS is an input member, wherein rotation power from a crank shaft of the engine is converted into torque by a torque converter and is input to the input shaft IS.

The output shaft OS is an output member to transfer shifted driving force to a driving shaft through a differential apparatus.

The first planetary gear set PG1, which is a single pinion planetary gear set, includes rotational elements such as a first sun gear S1, a first planetary carrier PC1 to support a first pinion gear P1 externally engaged with the first sun gear S1, and a first ring gear R1 to be internally engaged with the first pinion gear P1.

The second planetary gear set PG2, which is the single pinion planetary gear set, includes a second sun gear S2, a second planetary carrier PC2 to support a second pinion gear P2 externally engaged with the second sun gear S2, and a second ring gear R2 to be internally engaged with the second pinion gear P2.

The third planetary gear set PG3, which is the single pinion planetary gear set, includes a third sun gear S3, a third planetary carrier PC3 to support a third pinion gear P3 externally engaged with the third sun gear S3, and a third ring gear R3 to be internally engaged with the third pinion gear P3.

The fourth planetary gear set PG4, which is the single pinion planetary gear set, includes a fourth sun gear S4, a fourth planetary carrier PC4 to support a fourth pinion gear P4 externally engaged with the fourth sun gear S4, and a fourth ring gear R4 to be internally engaged with the fourth pinion gear P4.

In addition, the first, second, third, and fourth planetary gear sets PG1, PG2, PG3, and PG4 have one or more rotational elements directly connected thereto, so as to be operated while having a total of eight rotational shafts TM1 to TM8.

A configuration of the eight rotational shafts TM1 to TM8 will be described.

The first rotational shaft TM1 is configured to include the first and second sun gears S1 and S2 and is selectively connected to the transmission housing H.

The second rotational shaft TM2 is configured to include the first planetary carrier PC1 and the fourth ring gear R4.

The third rotational shaft TM3 is configured to include the first ring gear R1 and is selectively connected to the transmission housing H.

The fourth rotational shaft TM4 is configured to include the second planetary carrier PC2 and is directly connected with the input shaft IS so as to be operated as an input element.

The fifth rotational shaft TM5 is configured to include the second ring gear R2 and the third sun gear S3 and is selectively connected with the second rotational shaft TM2.

The sixth rotational shaft TM6 is configured to include the third planetary carrier PC3 and is selectively connected with the second rotational shaft TM2.

The seventh rotational shaft TM7 is configured to include the third ring gear R3 and the fourth planetary carrier PC4 and is directly connected with the output shaft OS so as to be always an output element.

The eighth rotational shaft TM8 is configured to include the fourth sun gear S4 and is selectively connected with the input shaft IS and is selectively connected with the sixth rotational shaft TM6.

In addition, four clutches C1, C2, C3, and C4, which are frictional elements, are disposed at portions where the any two rotational shafts are selectively connected to each other on the rotational shafts TM1 to TM8.

In addition, two brakes B1 and B2, which are the frictional elements, are disposed at portions where the any one rotational shafts TM1 to TM8 are selectively connected to the transmission housing H.

The positions where the six frictional elements C1 to C4 and B1 to B2 are disposed at will be described below.

The first clutch C1 is interposed between the input shaft IS and the eighth rotational shaft TM8 so as to function such that the first input shaft IS and the eighth rotational shaft TM8 are selectively integrated with each other.

The second clutch C2 is interposed between the second rotational shaft TM2 and the fifth rotational shaft TM5 so as to function such that the second rotational shaft TM2 and the fifth rotational shaft TM5 are selectively integrated with each other.

The third clutch C3 is interposed between the second rotational shaft TM2 and the sixth rotational shaft TM6 so as to function such that the second rotational shaft TM2 and the sixth rotational shaft TM6 are selectively integrated with each other.

The fourth clutch C4 is interposed between the sixth rotational shaft TM6 and the eighth rotational shaft TM8 so as to function such that the sixth rotational shaft TM6 and the eighth rotational shaft TM8 are selectively integrated with each other.

The first brake B1 is interposed between the first rotational shaft TM1 and the transmission housing H so as to function such that the first rotational shaft TM1 is to be selectively a fixing element.

The second brake B2 is interposed between the third rotational shaft TM3 and the transmission housing H so as to function such that the third rotational shaft TM3 is to be selectively a fixing element.

The respective frictional elements including the first, second, third, and fourth clutches C1, C2, C3, and C4, and the first and second brakes B1 and B2 may be formed of a multi-plate type hydraulic friction coupling unit which is frictionally coupled by hydraulic pressure.

FIG. 2 is an operation table for each shift stage of each frictional element which is used for the planetary gear train according to various embodiments of the present invention.

As shown in FIG. 2, the planetary gear train according to various embodiments of the present invention performs shifting by operating three frictional elements in each shift stage.

A forward 1st-speed shift stage (1ST) is implemented by simultaneously operating the first clutch C1 and the first and second brakes B1 and B2.

A forward 2nd-speed shift stage (2ND) is implemented by simultaneously operating the third clutch C3 and the first and second brakes B1 and B2.

A forward 3rd-speed shift stage (3RD) is implemented by simultaneously operating the first and third clutches C1 and C3 and the second brake B2.

A forward 4th-speed shift stage (4TH) is implemented by simultaneously operating the second and third clutches C2 and C3 and the second brake B2.

A forward 5th-speed shift stage (5TH) is implemented by simultaneously operating the first and second clutches C1 and C2 and the second brake B2.

A forward 6th-speed shift stage (6TH) is implemented by simultaneously operating the first and fourth clutches C1 and C4 and the second brake B2.

A forward 7th-speed shift stage (7TH) is implemented by simultaneously operating the first, second, and fourth clutches C1, C2, and C4.

A forward 8th-speed shift stage (8TH) is implemented by simultaneously operating the first and fourth clutches C1 and C4 and the first brake B1.

A forward 9th-speed shift stage (9TH) is implemented by simultaneously operating the first and second clutches C1 and C2 and the first brake B1.

A forward 10th-speed shift stage (10TH) is implemented by simultaneously operating the second and third clutches C2 and C3 and the first brake B1.

A forward 11th-speed shift stage (11TH) is implemented by simultaneously operating the first and third clutches C1 and C3 and the first brake B1.

A reverse shift stage (REV) is implemented by simultaneously operating the fourth clutch C4 and the first and second brakes B1 and B2.

The shifting process will be described below in more detail.

In the forward 1st-speed shift stage (1ST), when the first clutch C1 and the first and second brakes B1 and B2 are simultaneously operated, shifting to forward 1st-speed is implemented as an input is performed through the fourth and eighth rotational shafts TM4 and TM8 and the first and third rotational shafts TM1 and TM3 are operated as fixing elements on a state that the input shaft IS is connected with the eighth rotational shaft TM8.

In the forward 2nd-speed shift stage (2ND), when the third clutch C3 and the first and second brakes B1 and B2 are simultaneously operated, shifting to forward 2nd-speed is implemented as an input is performed through the fourth rotational shaft TM4 and the first and third rotational shafts TM1 and TM3 are operated as fixing elements on a state that the second rotational shaft TM2 is connected with the sixth rotational shaft TM6.

In the forward 3rd-speed shift stage (3RD), when the first and third clutches C1 and C3 and the second brake B2 are simultaneously operated, shifting to forward 3rd-speed is implemented as an input is performed through the fourth rotational shaft TM4 and the third rotational shaft TM3 is operated as a fixing element on a state that the shaft IS is connected with the eighth rotational shaft TM8 and the second rotational shaft TM2 is connected with the sixth rotational shaft TM6.

In the forward 4th-speed shift stage (4TH), when the second and third clutches C2 and C3 and the second brake B2 are simultaneously operated, shifting to forward 4th-speed is implemented as an input is performed through the fourth rotational shaft TM4 and the third rotational shaft TM3 is operated as a fixing element on a state that the second rotational shaft TM2 is connected with the fifth rotational shaft TM5 and the second rotational shaft TM2 is connected with the sixth rotational shaft TM6.

In the forward 5th-speed shift stage (5TH), when the first and second clutches C1 and C2 and the second brake B2 are simultaneously operated, shifting to forward 5th-speed is implemented as an input is performed through the fourth and eighth rotational shafts TM4 and TM8 and the third rotational TM3 is operated as a fixing element on a state that the input shaft IS is connected with the eighth rotational shaft TM8 and the second rotational shaft TM2 is connected with the fifth rotational shaft TM5.

In the forward 6th-speed shift stage (6TH), when the first and fourth clutches C1 and C4 and the second brake B2 are simultaneously operated, shifting to forward 6th-speed is implemented as an input is performed through the fourth and eighth rotational shafts TM4 and TM8 and the third rotational shaft TM3 is operated as a fixing element on a state that the input shaft IS is connected with the eighth rotational shaft TM8 and the sixth rotational shaft TM6 is connected with the eighth rotational shaft TM8.

In the forward 7th-speed shift stage (7TH), when the first, second, and fourth clutches C1, C2, and C4 are simultaneously operated, shifting to forward 7th-speed is implemented as an input is performed through the fourth and seventh rotational shafts TM4 and TM7 on a state that the input shaft IS is connected with the eighth rotational shaft TM8 and the second rotational shaft TM2 is connected with the fifth rotational shaft TM5 and the sixth rotational shaft TM6 is connected with the eighth rotational shaft TM8 such that the above mentioned all members are integrally connected.

In the forward 8th-speed shift stage (8TH), when the first and fourth clutches C1 and C4 and the first brake B1 are simultaneously operated, shifting to forward 8th-speed is implemented as an input is performed through the fourth and seventh rotational shafts TM4 and TM7 and the first rotational shaft TM1 is operated as a fixing element on a state that the input shaft IS is connected with the eighth rotational shaft TM8 and the sixth rotational shaft TM6 is connected with the eighth rotational shaft TM8.

In the forward 9th-speed shift stage (9TH), when the first and second clutches C1 and C2 and the first brake B1 are simultaneously operated, shifting to forward 9th-speed is implemented as an input is performed through the fourth and eighth rotational shafts TM4 and TM8 and the first rotational shaft TM1 is operated as a fixing element on a state that the input shaft IS is connected with the eighth rotational shaft TM8 and the second rotational shaft TM2 is connected with the fifth rotational shaft TM5.

In the forward 10th-speed shift stage (10TH), when the second and third clutches C2 and C3 and the first brake B1 are simultaneously operated, shifting to forward 10-speed is implemented as an input is performed through the fourth rotational shaft TM4 and the first rotational shaft TM1 is operated as a fixing element on a state that the second rotational shaft TM2 is connected with the fifth rotational shaft TM5 and the second rotational shaft TM2 is connected with the sixth rotational shaft TM6.

In the forward 11th-speed shift stage (11TH), when the first and third clutches C1 and C3 and the first brake B1 are simultaneously operated, shifting to forward 11th-speed is implemented as an input is performed through the fourth rotational shaft TM4 and the first rotational shaft TM1 is operated as a fixing element on a state that the input shaft IS is connected with the eighth rotational shaft TM8 and the second rotational shaft TM2 is connected with the sixth rotational shaft TM6.

In the reverse shift stage (REV), when the fourth clutch C4 and the first and second brakes B1 and B2 are simultaneously operated, shifting to reverse speed is implemented as an input is performed through the fourth rotational shaft TM4 and the first and third rotational shafts TM1 and TM3 are operated as fixing elements on a state that the sixth rotational shaft TM6 is connected with the eighth rotational shaft TM8.

As described above, the planetary gear train according to various embodiments of the present invention may implement a shift stage of 11 forward speeds and 1 reverse speed with the fourth planetary gear sets PG1, PG2, PG3, and PG4 by the operation control of the fourth clutches C1, C2, C3, and C4, and the two brakes B1 and B2.

According to various embodiments of the present invention, power transfer efficiency and fuel efficiency can be improved by multiple speed stages of the automatic transmission.

In addition, driving silence can be significantly improved as a suitable shift stage according to the RPM of the engine is implemented by the multi-stage of the automatic transmission.

Further, so the three frictional elements are operated for each shift stage that the number of frictional elements which are not operated is minimized to reduce friction drag loss, the power transfer efficiency and the fuel efficiency can be better.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
an input shaft receiving power of an engine;
an output shaft outputting shifted power of the engine;
a first planetary gear set including a first sun gear, a first planetary carrier, and a first ring gear;
a second planetary gear set including a second sun gear, a second planetary carrier, and a second ring gear;
a third planetary gear set including a third sun gear, a third planetary carrier, and a third ring gear;
a fourth planetary gear set including a fourth sun gear, a fourth planetary carrier, and a fourth ring gear;
a first rotational shaft including the first and second sun gears and selectively connected with a transmission housing;
a second rotational shaft including the first planetary carrier and the fourth ring gear;
a third rotational shaft including the first ring gear and selectively connected with the transmission housing;
a fourth rotational shaft including the second planetary carrier and directly connected with the input shaft to be continuously operated as an input element;
a fifth rotational shaft including the second ring gear and the third sun gear and selectively connected with the second rotational shaft;
a sixth rotational shaft including the third planetary carrier and selectively connected with the second rotational shaft;
a seventh rotational shaft including the third ring gear and the fourth planetary carrier and directly connected with the output shaft to be continuously operated as an output element;
an eighth rotational shaft including the fourth sun gear, selectively connected with the input shaft, and selectively connected with the sixth rotational shaft; and
six frictional elements provided to selectively connect at least two rotational shafts with each other and to selectively connect at least one of the rotational shafts with the transmission housing.

2. The planetary gear train of the automatic transmission for the vehicle of claim 1, wherein each of the first, second, third, and fourth planetary gear sets are respectively a single pinion planetary gear set.

3. The planetary gear train of the automatic transmission for the vehicle of claim 1, wherein the first, second, third, and fourth planetary gear sets are sequentially disposed from an engine side.

4. The planetary gear train of the automatic transmission for the vehicle of claim 1, wherein the six frictional elements comprise:
a first clutch interposed between the input shaft and the eighth rotational shaft;
a second clutch interposed between the second rotational shaft and the fifth rotational shaft;
a third clutch interposed between the second rotational shaft and the sixth rotational shaft;
a fourth clutch interposed between the sixth rotational shaft and the eighth rotational shaft;
a first brake interposed between the first rotational shaft and the transmission housing; and
a second brake interposed between the third rotational shaft and the transmission housing.

5. The planetary gear train of the automatic transmission for the vehicle of claim 4, wherein shift stages implemented by selective operation of each of the six frictional elements comprise:
a first forward shift stage implemented by simultaneously operating the first clutch and the first and second brakes;
a second forward shift stage implemented by simultaneously operating the third clutch and the first and second brakes;
a third forward shift stage implemented by simultaneously operating the first and third clutches and the second brake;
a fourth forward shift stage implemented by simultaneously operating the second and third clutches and the second brake;
a fifth forward shift stage implemented by simultaneously operating the first and second clutches and the second brake;
a sixth forward shift stage implemented by simultaneously operating the first and fourth clutches and the second brake;
a seventh forward shift stage implemented by simultaneously operating the first, second, and fourth clutches;
an eighth forward shift stage implemented by simultaneously operating the first and fourth clutches and the first brake;
a ninth forward shift stage implemented by simultaneously operating the first and second clutches and the first brake;
a tenth forward shift stage implemented by simultaneously operating the second and third clutches and the first brake;
an eleventh forward shift stage implemented by simultaneously operating the first and third clutches and the first brake; and
a reverse shift stage implemented by simultaneously operating the fourth clutch and the first and second brakes.

6. A planetary gear train of an automatic transmission for a vehicle comprising:
an input shaft receiving power of an engine;
an output shaft outputting shifted power of the engine;
a first planetary gear set including a first sun gear, a first planetary carrier, and a first ring gear;
a second planetary gear set including a second sun gear, a second planetary carrier, and a second ring gear;
a third planetary gear set including a third sun gear, a third planetary carrier, and a third ring gear;
a fourth planetary gear set including a fourth sun gear, a fourth planetary carrier, and a fourth ring gear;
a first clutch selectively connecting the input shaft with the fourth sun gear;
a second clutch selectively connecting the first planetary carrier and the fourth ring gear with the second ring gear and the third sun gear;
a third clutch selectively connecting the first planetary carrier and the fourth ring gear with the third planetary carrier;
a fourth clutch selectively connecting the third planetary carrier with the fourth sun gear;
a first brake selectively connecting the first sun gear to the transmission housing; and
a second brake selectively connecting the first ring gear to the transmission housing,
wherein the input shaft is directly connected with the second planetary carrier,
the output shaft is directly connected with the fourth planetary carrier,
the first sun gear is directly connected with the second sun gear, the first planetary carrier is directly connected with the fourth ring gear, the second ring gear is directly connected with the third sun gear, and third ring gear is directly connected with the fourth planetary carrier.

7. The planetary gear train of the automatic transmission for the vehicle of claim 6, wherein the first, second, third, and fourth planetary gear sets are each single pinion planetary gear sets.

8. The planetary gear train of the automatic transmission for the vehicle of claim 6, wherein the first, second, third, and fourth planetary gear sets are sequentially arranged from an engine side.

9. The planetary gear train of the automatic transmission for the vehicle of claim 6, wherein shift stages implemented by selectively operating the first, second, third, and fourth clutches and the first and second brakes comprise:

a first forward shift stage implemented by simultaneously operating the first clutch and the first and second brakes;

a second forward shift stage implemented by simultaneously operating the third clutch and the first and second brakes;

a third forward shift stage implemented by simultaneously operating the first and third clutches and the second brake;

a fourth forward shift stage implemented by simultaneously operating the second and third clutches and the second brake;

a fifth forward shift stage implemented by simultaneously operating the first and second clutches and the second brake;

a sixth forward shift stage implemented by simultaneously operating the first and fourth clutches and the second brake;

a seventh forward shift stage implemented by simultaneously operating the first, second, and fourth clutches;

an eighth forward shift stage implemented by simultaneously operating the first and fourth clutches and the first brake;

a ninth forward shift stage implemented by simultaneously operating the first and second clutches and the first brake;

a tenth forward shift stage implemented by simultaneously operating the second and third clutches and the first brake;

an eleventh forward shift stage implemented by simultaneously operating the first and third clutches and the first brake; and a reverse shift stage implemented by simultaneously operating the fourth clutch and the first and second brakes.

* * * * *